United States Patent
Toguri et al.

(10) Patent No.: US 7,315,819 B2
(45) Date of Patent: Jan. 1, 2008

(54) APPARATUS FOR PERFORMING SPEAKER IDENTIFICATION AND SPEAKER SEARCHING IN SPEECH OR SOUND IMAGE DATA, AND METHOD THEREOF

(75) Inventors: Yasuhiro Toguri, Kanagawa (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 990 days.

(21) Appl. No.: 10/201,069

(22) Filed: Jul. 23, 2002

(65) Prior Publication Data

US 2003/0036905 A1 Feb. 20, 2003

(30) Foreign Application Priority Data

Jul. 25, 2001 (JP) ............................. 2001-225051

(51) Int. Cl.
*G10L 17/00* (2006.01)
(52) U.S. Cl. ...................................... 704/246; 704/238
(58) Field of Classification Search .................... None
See application file for complete search history.

(56) References Cited

U.S. PATENT DOCUMENTS

| | | | |
|---|---|---|---|
| 4,975,956 A * | 12/1990 | Liu et al. ..................... 704/219 |
| 5,012,518 A * | 4/1991 | Liu et al. ..................... 704/222 |
| 5,125,022 A * | 6/1992 | Hunt et al. ................... 704/252 |
| 5,303,299 A * | 4/1994 | Hunt et al. ................... 704/246 |
| 5,666,466 A * | 9/1997 | Lin et al. ..................... 704/246 |

* cited by examiner

*Primary Examiner*—David D. Knepper
(74) *Attorney, Agent, or Firm*—Robert J. Depke; Rockey, Depke & Lyons, LLC.

(57) ABSTRACT

A process of identifying a speaker in coded speech data and a process of searching for the speaker are efficiently performed with fewer computations and with a smaller storage capacity. In an information search apparatus, an LSP decoding section extracts and decodes only LSP information from coded speech data which is read for each block. An LPC conversion section converts the LSP information into LPC information. A Cepstrum conversion section converts the obtained LPC information into an LPC Cepstrum which represents features of speech. A vector quantization section performs vector quantization on the LPC Cepstrum. A speaker identification section identifies a speaker on the basis of the result of the vector quantization. Furthermore, the identified speaker is compared with a search condition in a condition comparison section, and based on the result, the search result is output.

8 Claims, 9 Drawing Sheets

FIG. 8

| SPEAKER IDENTIFICATION NAME | ABSOLUTE MAXIMUM DISTORTION VALUE Dmax | MINIMUM DISTORTION DIFFERENCE ΔDmin |

FIG. 9

| SPEAKER IDENTIFICATION NUMBER | SPEAKER CODEBOOK NUMBER | SPEAKER NAME | OTHER INFORMATION (SEX, AGE, etc.) |

APPARATUS FOR PERFORMING SPEAKER IDENTIFICATION AND SPEAKER SEARCHING IN SPEECH OR SOUND IMAGE DATA, AND METHOD THEREOF

This application claims priority to Japanese Patent Application Number JP2001-225051 filed Jul. 25, 2001 which is incorporated herein by reference.

BACKGROUND OF THE INVENTION

1. Field of the Invention

The present invention relates to an information detection apparatus and method, and to an information search apparatus and method. More particularly, the present invention relates to an information detection apparatus and method, and to an information search apparatus and method, for performing speaker identification and speaker searching in speech data or sound image data.

2. Description of the Related Art

In recent years, often, speech signals are digitized, the digital speech signals are coded, and then the digital speech signals are stored or used. These speech coding methods can be broadly classified into speech waveform coding, analysis/synthesis coding, and hybrid coding in which these coexist.

Here, in speech waveform coding, a speech waveform is coded so that it can be reproduced as faithfully as possible. In analysis/synthesis coding, a signal is coded by representing it by parameters on the basis of a speech creation model. In particular, as analysis/synthesis coding, analysis/synthesis systems using linear predictive coding (LPC) analysis have been investigated. For example, there are harmonic coding, multipulse driving linear predictive coding (MPC) using an analysis-by-synthesis (A-b-S) method, code excited linear prediction (CELP) coding by closed loop search of an optimum vector, etc.

In general, in the coding method using LPC analysis, spectral envelope information is extracted by linear predictive analysis (LPC analysis), and the LPC information is converted into PARCOR (PARtial auto-CORrelation) coefficients or LSP (Linear Spectrum Pair) coefficients and then coded. Furthermore, a method has been investigated in which a determination is made as to whether the speech is a voiced sound or an unvoiced sound for each block and in which harmonic coding is used for voiced sound and CELP coding is used for unvoiced sound. In addition, a hybrid method has also been investigated in which coding is performed using analysis/synthesis coding by LPC analysis and using speech waveform coding for the LPC residual signal thereof.

FIG. 10 shows the overall configuration of a general speech coding apparatus using LPC analysis. In FIG. 10, a speech signal D100 input from an input section 100 is subjected to LPC analysis in an LPC analysis section 101, and an LPC coefficient D101 is determined. The LPC coefficient D101 is converted into an LSP parameter D102 in an LSP conversion section 102. The LSP parameter D102 is quantized in an LSP quantization section 103. Since the performance degradation of the LSP parameter is smaller than that of the LPC coefficient when the LSP parameter is quantized, usually, the LPC coefficient is converted into an LSP parameter and then quantized. As the quantization method of the LSP parameter, vector quantization is often used.

Meanwhile, in an inverse filter section 104, the input signal D100 is filtered using the determined LPC coefficient D101, and an LPC residual signal D104 is extracted from the input signal D100. For the coefficient used for the inverse filter, a coefficient which is inversely converted from a quantized LSP parameter into an LPC coefficient is also often used.

The LPC residual signal D104 which is determined in this manner is converted into a spectrum coefficient D105 in a spectrum conversion section 105, and quantization is performed thereon in a spectrum quantization section 106. For the quantization of the spectrum coefficient, a vector quantization method, and a method in which quantization based on an auditory psychological model, Huffman coding, etc., are combined, are often used.

A quantized LSP parameter D103, a quantized spectrum D106, and other additional information, which are determined in this manner, are sent to a bit combining section 107, where a coded bit stream D107 is generated in accordance with a specified data format and is output to an output section 108.

In addition to the configuration of the speech coding apparatus shown in FIG. 10, a method has been investigated in which the pitch is extracted using an LPC residual signal, and pitch components are extracted from the LPC residual signal, thereby flattening the spectrum residual. Furthermore, a method has also been investigated in which a determination is made as to whether the speech is a voiced sound or an unvoiced sound, a harmonic is extracted from the spectrum residual signal of the voiced sound, and the harmonic is quantized.

An example of a recording format of coded speech data generated by a speech coding apparatus using LPC analysis, such as that shown in FIG. 10, is shown in FIG. 11. As shown in FIG. 11, quantized LSP information is held in coded data. This quantized LSP information can easily be converted into an LPC coefficient. Since the LPC coefficient shows spectral envelope information, it can also be considered that quantized spectral envelope information is held.

Technology for identifying a speaker in a speech signal has also been intensely investigated. This technology will be described below.

First, speaker recognition includes speaker identification and speaker verification. Speaker identification determines which speaker, from among speakers registered in advance, produced the input speech. Speaker verification makes personal identification by comparing the input speech with the data of the speaker which is registered in advance. Furthermore, there are two types of speaker recognition: a speech production dependent type in which words (keywords) which are produced during recognition are determined in advance, and a speech production independent type in which arbitrary words are produced for recognition.

As a general speech recognition technology, for example, the following technology is often used. First, features representing the individuality of a speech signal of a particular speaker are extracted and recorded in advance as learnt data. Identification/verification of the speaker is performed in such a way that the input speech of the speaker is analyzed to extract the features representing the individuality, and the similarity of the features with the learnt data is evaluated. Here, for the features representing the individuality of speech, a Cepstrum is often used. Cepstrum means that a logarithmic spectrum is subjected to an inverse Fourier transform, and the envelope of the speech spectrum can be represented by the coefficients of the low-order terms thereof. Alternatively, often, LPC analysis is performed on a speech signal in order to determine an LPC coefficient, and the LPC Cepstrum coefficient obtained by converting the LPC coefficient is used. The polynomial expansion coefficients of the time series of these Cepstrums or LPC Cepstrum coefficients are called "delta Cepstrums", and these are often used as features representing the change of the speech spectrum over time. In addition, the pitch and the delta pitch (polynomial expansion coefficients of the pitch) are sometimes used.

Learing data is created by using the features, such as LPC (Linear Predictive Coding) Cepstrums, extracted in this manner, as a standard pattern. The typical methods thereof include a vector-quantization distortion method and a hidden Markov model (HMM) method.

In the vector-quantization distortion method, the features for each speaker are grouped, and the center of gravity thereof is stored in advance as an element (code vector) of a codebook. Then, the features of the input speech are subjected to vector quantization by using the codebook of each speaker, and the average quantized distortion of each codebook with respect to the entire input speech is determined.

In the case of speaker identification, the speaker of the codebook in which the average quantized distortion is smallest is selected. In the case of speaker verification, the average quantized distortion by the codebook of the corresponding speaker is compared with a threshold value in order to make personal identification.

On the other hand, in the HMM method, the features of the speaker determined in the same manner as that described above are represented by the transition probability between states of the hidden Markov model (HMM) and the appearance probability of the features in each state. The features are determined by the average likelihood with respect to the model in the entire input speech region.

Furthermore, in the case of speaker identification in which independent speakers which are not registered in advance are contained, a determination is made by a method combining the above-described speaker identification and speaker verification. That is, the closest speaker is selected as a candidate from a set of registered speakers, and the quantized distortion or the likelihood of the candidate is compared with a threshold value in order to make personal identification.

In the speaker verification or the speaker identification in which independent speakers are contained, in order to make personal identification, the likelihood of the speaker or the quantized distortion is compared with a threshold value. At this time, for these values, due to variations of the features over time, differences in spoken sentences, and the influence of noise, variations between the input data and the learnt data (model) are large even for the same speaker. Generally, even if the threshold value is set to the absolute value thereof, a sufficient recognition rate cannot be reliably obtained.

Therefore, in speaker recognition in HMMs, normalizing the likelihood is generally performed. For example, there is a method in which a log likelihood ratio LR, such as that shown in the following equation (1), is used for the determination:

$$LR = \log L(X/Sc) - \max\{\log L(X/Sr)\} \qquad (1)$$

In equation (1), L(X/Sc) is the likelihood of the verification target speaker Sc (identified person) with respect to the input speech X. L(X/Sr) is the likelihood of a speaker Sr other than the speaker Sc with respect to the input speech X. That is, a threshold value is set dynamically in accordance with the likelihood with respect to the input speech X, and the speaker recognition becomes robust with respect to differences in spoken content and variations over time.

Alternatively, a method of making a determination by a posterior probability, such as that shown in the following equation (2), by using the concept of a posterior probability, has also been investigated. Here, P(Sc) and P(Sr) are appearance probabilities of the speakers Sc and Sr, respectively. Σ represents the sum of all the speakers.

$$L(Sc/X) = [L(X/Sc) \cdot P(Sc)] / [\Sigma L(X/Sr) \cdot P(Sr)] \qquad (2)$$

These methods of likelihood normalization using HMMs are described in detail in reference [4], etc., which will be described later.

In addition to those described above, in the conventional speaker recognition technology, a method has been investigated in which, instead of using all the blocks of a speech signal for recognition, for example, the voiced sound (vowel) part and the unvoiced sound (consonant) part of the input speech signal are detected and in which recognition is performed by using only the voiced sound (vowel) part. Furthermore, a method has also been investigated in which recognition is performed by using individual learning models or codebooks with the voiced sound (vowel) and the unvoiced sound (consonant) being discriminated.

The conventional technologies regarding speaker recognition described above are described in detail, for example, in the following references: [1] Furui: "Speaker recognition by statistical features of the Cepstrum", Proc. of The Institute of Electronics, Information and Communication Engineers (IEICE), Vol. J65-A, No. 2, pp. 183-193 (1982), [2] F. K. Soong and A. E. Rosenberg: "On the Use of Instantaneous and Transitional Spectral Information in Speaker Recognition", IEEE Trans. ASSP, Vol. 36, No. 6, pp. 871-879 (1988), [3] Furui: "Topic of speech individuality", Journal of Acoustical Society of Japan (ASJ), 51, 11, pp. 876-881, (1995), [4] Matsui: "Speaker recognition by HMM", Technical Report of IEICE, Vol. 95, No. 467, (SP95 109-116) pp. 17-24 (1996), [5] THE DIGITAL SIGNAL PROCESSING HANDBOOK, IEEE PRESS (CRC Press), 1998, [6] F. K. Soong, A. E. Rosenberg, L. R. Rabiner and B. H. Juang: "A vector quantization approach to speaker recognition", Proc. IEEE, Int. Conf. on Acoust. Speech & Signal Processing, pp. 387-390 (1985).

Identification processes in the conventional speaker detection and searching are performed in such a way that a speech signal is digitized and the digitized speech waveform is analyzed. However, recently, with the proliferation of and advances in high-efficiency speech coding technology, most speech data is stored and used in a compressed and coded format. In order to identify and search for a speaker based on the features of the speech with respect to such speech data, it is necessary to decode all coded speech data to be searched into a speech waveform, to analyze the features, and to perform an identification process and a searching process. Since such decoding, analysis, and identification processes must be performed on all target speech data, a large number of computations and a lot of processing time are required, and furthermore, a storage area corresponding to the capacity capable of storing the decoded speech data becomes necessary. Furthermore, the recognition performance may become deteriorated due to the influence of performing decoding processing into a speech waveform and performing reanalysis processing.

SUMMARY OF THE INVENTION

The present invention has been proposed in view of such a conventional situation. An object of the present invention is to provide an information detection apparatus and method, and an information search apparatus and method, which are capable of performing speaker identification and speaker searching efficiently with fewer computations and a smaller storage capacity on compressed and coded speech data.

To achieve the above-mentioned object, in one aspect, the present invention provides an information detection apparatus for detecting predetermined information from coded speech data coded by a speech coding method using spectrum analysis, the information detection apparatus comprising: spectral information decoding means for decoding spectral information from the coded speech data; and speaker identification means for identifying a speaker on the basis of the decoded spectral information.

Here, the spectrum analysis may be analysis of a spectral envelope, and the spectral information may be spectral envelope information.

The spectral envelope analysis may be LPC (Linear Predictive Coding) analysis, and the spectral envelope information may be LPC information or LPC-related information which can be converted into LPC information.

In such an information detection apparatus, when a speaker is to be identified by using coded speech data, which is coded using spectrum analysis, as a target, a process of decoding the coded speech data into a speech waveform and a process of analyzing the decoded speech waveform are not performed. Only the spectral information is decoded from the coded speech data, and a process of identifying the speaker is performed on the basis of the spectral information.

As a result, the number of computations and the storage capacity necessary for identification processing can be greatly reduced. Furthermore, the deterioration of recognition performance due to the influence of decoding and reanalysis can be reduced.

To achieve the above-mentioned object, in another aspect, the present invention provides an information detection method for detecting predetermined information from coded speech data coded by a speech coding method using spectrum analysis, the information detection method comprising: a spectral information decoding step of decoding spectral information from the coded speech data; and a speaker identification step of identifying a speaker on the basis of the decoded spectral information.

Here, the spectrum analysis may be analysis of a spectral envelope, and the spectral information may be spectral envelope information.

The analysis of the spectral envelope may be LPC (Linear Predictive Coding) analysis, and the spectral envelope information may be LPC information or LPC-related information which can be converted into LPC information.

In such an information detection method, when a speaker is to be identified by using coded speech data, which is coded using spectrum analysis, as a target, a process of decoding the coded speech data into a speech waveform and a process of analyzing the decoded speech waveform are not performed. Only the spectral information is decoded from the coded speech data, and a process of identifying the speaker is performed on the basis of the spectral information.

As a result, the number of computations and the storage capacity necessary for identification processing can be greatly reduced. Furthermore, the deterioration of recognition performance due to the influence of decoding and reanalysis can be reduced.

To achieve the above-mentioned object, in another aspect, the present invention provides an information search apparatus for searching for desired information from coded speech data coded by a speech coding method using spectrum analysis, the information search apparatus comprising: search condition input means for inputting a search condition; spectral information decoding means for decoding spectral information from the coded speech data; speaker identification means for identifying a speaker on the basis of the decoded spectral information; condition comparison means for comparing the identified speaker information with the input search condition in order to search for a desired speaker; and search result output means for outputting, based on the search result, at least information about coded speech data containing a conversation portion of the desired speaker and information of that conversation portion.

Here, the spectrum analysis may be an analysis of a spectral envelope, and the spectral information may be spectral envelope information.

The spectral envelope analysis may be LPC (Linear Predictive Coding) analysis, and the spectral envelope information may be LPC information or LPC-related information which can be converted into LPC information.

In such an information search apparatus, when a speaker is to be identified by using coded speech data, which is coded using spectrum analysis, as a target, a process of decoding the coded speech data into a speech waveform and a process of analyzing the decoded speech waveform are not performed. Only the spectral information is decoded from the coded speech data, and a process of identifying the speaker is performed on the basis of the spectral information. Then, by comparing the identified speaker information with the search condition, a process for searching for the desired speaker is performed.

As a result, the number of computations and the storage capacity necessary for identification processing can be greatly reduced. Furthermore, the deterioration of recognition performance due to the influence of decoding and reanalysis can be reduced. Thus, it is possible to appropriately search for a desired speaker.

To achieve the above-mentioned object, in another aspect, the present invention provides an information search method for searching for desired information from coded speech data coded by a speech coding method using spectrum analysis, the information search method comprising: a search condition input step of inputting a search condition; a spectral information decoding step of decoding spectral information from the coded speech data; a speaker identification step of identifying a speaker on the basis of the decoded spectral information; a condition comparison step of comparing the identified speaker information with the input search condition in order to search for a desired speaker; and a search result output step of outputting, based on the search result, at least information about coded speech data containing a conversation portion of the desired speaker and information of that conversation portion.

Here, the spectrum analysis may be an analysis of a spectral envelope, and the spectral information may be spectral envelope information.

The spectral envelope analysis may be LPC (Linear Predictive Coding) analysis, and the spectral envelope information may be LPC information or LPC-related information which can be converted into LPC information.

In such an information search method, when a speaker is to be identified by using coded speech data, which is coded using spectrum analysis, as a target, a process of decoding the coded speech data into a speech waveform and a process of analyzing the decoded speech waveform are not performed. Only the spectral information is decoded from the coded speech data, and a process of identifying the speaker is performed on the basis of the spectral information. Then, by comparing the identified speaker information with the search condition, a process of searching for the desired speaker is performed.

As a result, the number of computations and the storage capacity necessary for identification processing can be greatly reduced. Furthermore, the deterioration of recognition performance due to the influence of decoding and reanalysis can be reduced. Thus, it is possible to appropriately search for a desired speaker.

BRIEF DESCRIPTION OF THE DRAWINGS

FIG. 8 illustrates an example of a recording format of threshold data used to verify a speaker in the information search apparatus;

FIG. 9 illustrates an example of a speaker information database in the information search apparatus;

DESCRIPTION OF THE PREFERRED EMBODIMENTS

Specific embodiments according to the present invention will be described below in detail with reference to the drawings. In these embodiments, the present invention is applied to an information detection apparatus and method for extracting only the spectral information from coded speech data coded by a speech coding method using spectrum analysis and identifying a speaker in the coded speech data in order to detect speaker information, and is applied to an information search apparatus and method for searching for a desired speaker by comparing speaker information with a search condition. In the following, descriptions are given of an example in which, as a spectrum analysis method, in particular, spectral envelope information is analyzed and of an example in which, as a method of analyzing spectral envelope information, in particular, LPC (Linear Predictive Coding) analysis is used.

Figure 1:
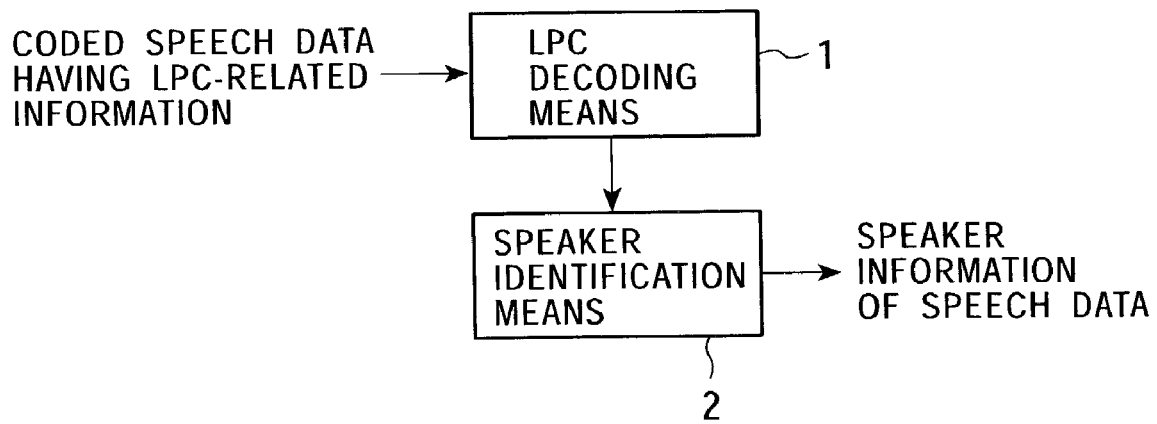
FIG. 1 illustrates a conceptual configuration of an information detection apparatus according to an embodiment of the present invention.

First, a conceptual diagram of the configuration of an information detection apparatus in this embodiment is shown in FIG. 1. As shown in FIG. 1, in the information detection apparatus, coded speech data having LPC-related information, which serves as an information source, is input to LPC decoding means 1, where LPC information is extracted and decoded.

Speaker identification means 2 inputs the LPC information decoded by the LPC decoding means 1 and identifies the speaker in the speech data on the basis of the LPC information. The speaker identification means 2 outputs this identification result as the speaker information of the speech data.

Figure 2:
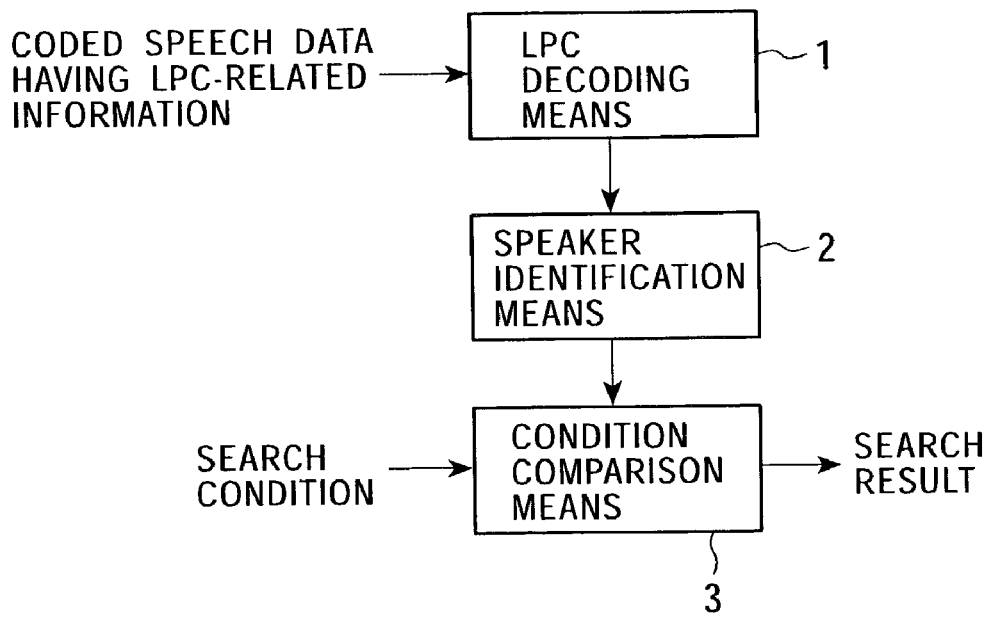
FIG. 2 illustrates a conceptual configuration of an information search apparatus according to an embodiment of the present invention.

Furthermore, a conceptual diagram of the configuration of an information search apparatus in this embodiment is shown in FIG. 2. As shown in FIG. 2, the information search apparatus has condition comparison means 3 in addition to the LPC decoding means 1 and the speaker identification means 2 shown in FIG. 1. This condition comparison means 3 compares the speaker information in the speech data input from the speaker identification means 2 with the input search condition, searches the speech data part produced by the desired speaker, and outputs the search result.

Figure 3:
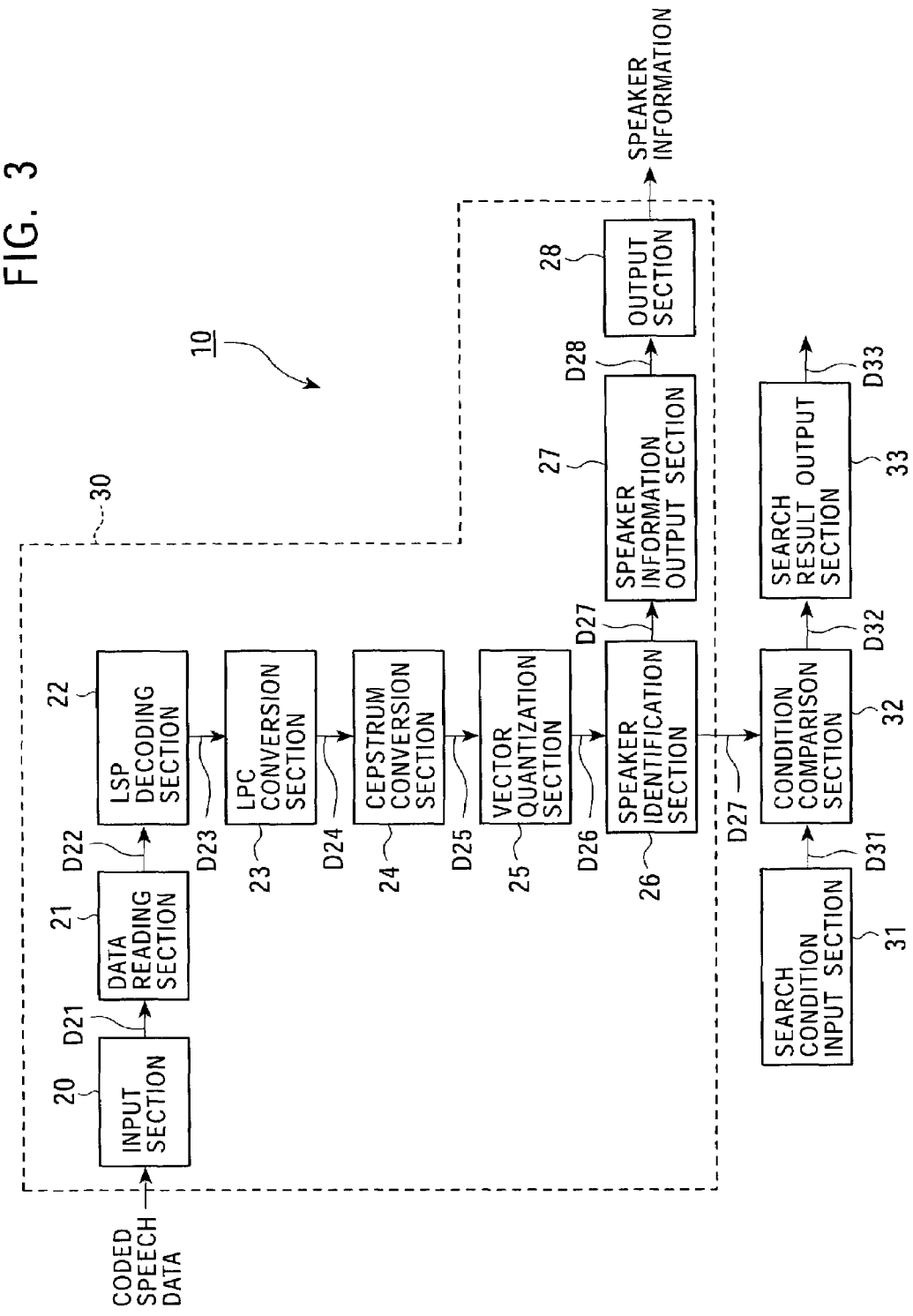
FIG. 3 illustrates the configuration of the information detection apparatus and the information search apparatus.

A specific example of the configuration of the information search apparatus shown in FIG. 2 is shown in FIG. 3. This information search apparatus 10 converts the LPC information obtained by LPC analysis into LSP (Linear Spectrum Pair) information, and performs speaker identification and speaker searching by using quantized and coded speech data as processing targets. Here, the information search apparatus 10 uses, as the identification features, in particular, the LPC Cepstrum obtained by converting the LPC information extracted from, the coded speech data, and uses vector quantization as an identification method. Of course, the method of identifying the speaker on the basis of the LPC information is not limited to the method of this embodiment.

As shown in FIG. 3, the information search apparatus 10 comprises an input section 20 for inputting coded speech data; a data reading section 21 for reading the input coded speech data for each block; an LSP decoding section 22 for extracting and decoding LSP information from the coded speech data; an LPC conversion section 23 for converting the LSP information into LPC information; a Cepstrum conversion section 24 for converting the obtained LPC information into LPC Cepstrums which represent the speech features; a vector quantization section 25 for performing vector quantization on the LPC Cepstrum; a speaker identification section 26 for identifying a speaker on the basis of the result of the vector quantization; a speaker information output section 27 for outputting information about the identified speaker in a predetermined format; an information detection section 30 having an output section 28 from which the speaker information is output; a search condition input section 31 for inputting a search condition; a condition comparison section 32 for comparing the search condition with the speaker information in order to perform a search; and a search result output section 33 for outputting the search result. The information detection section 30 corresponds to the information detection apparatus shown in FIG. 1.

The data reading section 21 reads coded data D21 for each predetermined block from the input section 20 and supplies coded data D22 for each block to the LSP decoding section 22.

The LSP decoding section 22 extracts and decodes only the LSP information from the coded data D22 for each block, supplied from the data reading section 21, and supplies the decoded LSP information D23 to the LPC conversion section 23.

The LPC conversion section 23 converts the LSP information D23 supplied from the LSP decoding section 22 into LPC information D24. The LPC conversion section 23 supplies the LPC information D24 to the Cepstrum conversion section 24.

The Cepstrum conversion section 24 converts the LPC information D24 supplied from the LPC conversion section 23 in order to determine an LPC Cepstrum D25 and supplies this LPC Cepstrum D25 to the vector quantization section 25.

The vector quantization section 25 performs vector quantization on the LPC Cepstrum D25 by using the codebook for each registered speaker. Furthermore, the vector quantization section 25 supplies the result of the vector quantization (quantized distortion) D26 by each codebook to the speaker identification section 26.

The speaker identification section 26 evaluates the vector-quantized distortion D26, and performs speaker identification and verification for each predetermined recognition block. This speaker identification and verification will be described in detail later. The speaker identification section 26 supplies an identified speaker number D27 to the speaker information output section 27 and the condition comparison section 32.

The speaker information output section 27 searches a database (not shown) for the information of the speaker on the basis of the identified speaker number D27, and outputs speaker information D28 in a predetermined format. Of course, the speaker number D27 may be output directly.

The search condition input section 31 inputs search conditions D31, such as the name, the registration number, etc., of a desired speaker, and supplies them to the condition comparison section 32.

The condition comparison section 32 compares the speaker number D27 supplied from the speaker identification section 26 with the search conditions D31, such as the name, the registration number, etc., of a desired speaker, supplied from the search condition input section 31. When the speaker number D27 matches the search conditions D31, a speaker number D32 of the speaker is supplied to the search result output section 33.

The search result output section 33 searches the database (not shown) for the information of the speaker on the basis of the speaker number D32, and outputs a search result D33 in a predetermined format together with the searched coded speech data, the position of the desired speaker within the coded speech data name, etc. Of course, it may be only the speaker number, the coded speech data name, and the position of the desired speaker within the coded speech data that are output.

With a construction such as that described above, it is possible for the information search apparatus 10 to search a conversation part produced by the desired speaker without decoding the coded speech data.

Figure 4:
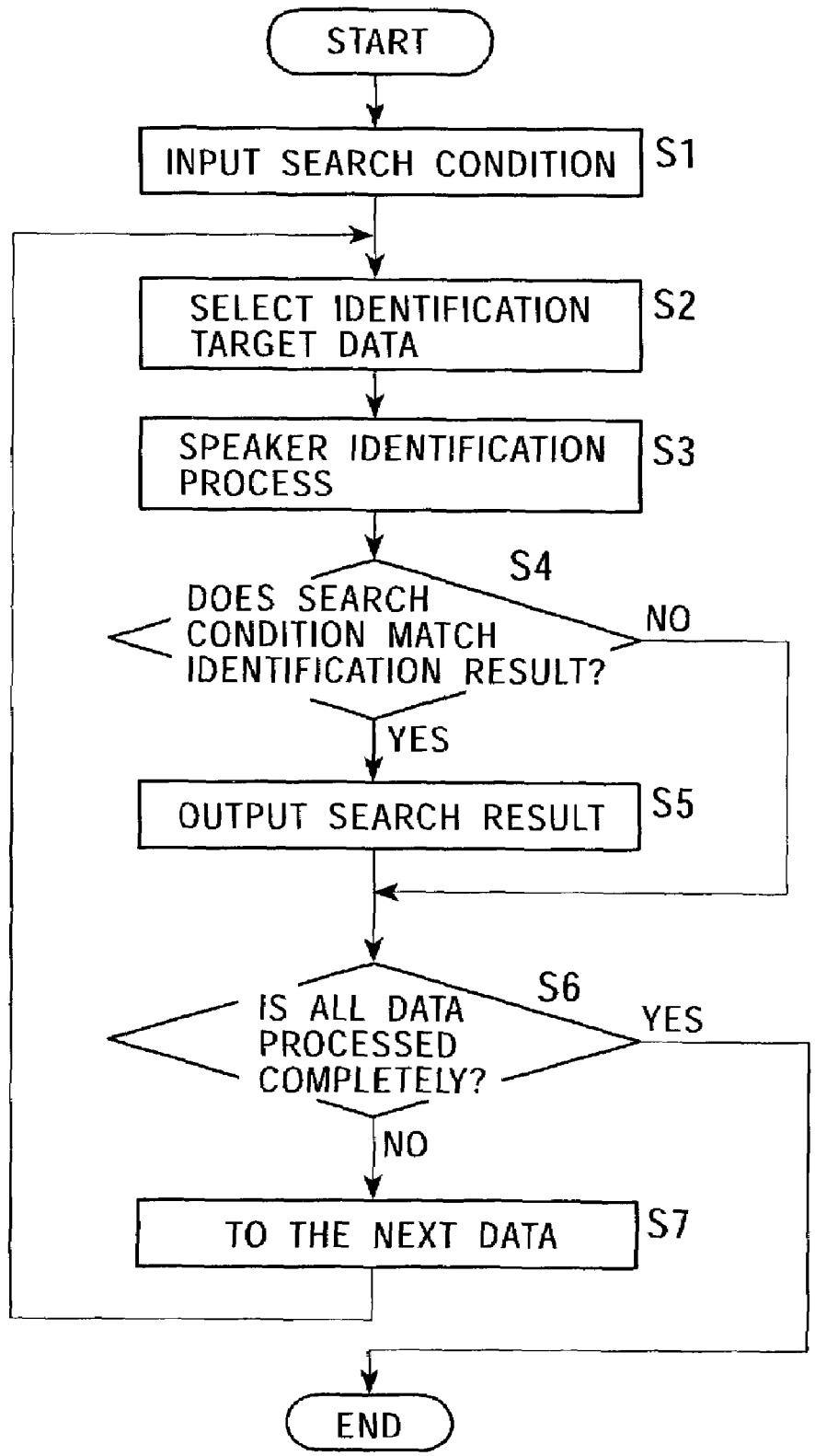
FIG. 4 is a flowchart illustrating a series of processes of the information search apparatus.

The operation of the information search apparatus 10 will be described below with reference to the flowchart in FIG. 4. Initially, in step S1, the search condition of a desired speaker is input. In step S2, one item of data to be identified is selected from a single or a plurality of pieces of coded speech data to be searched.

Next, in step S3, a speaker identification process of the data selected in step S2 is performed. The details of the speaker identification process will be described later.

Next, in step S4, the search condition input in step S1 is compared with the speaker information obtained in the speaker identification process in step S3 in order to determine whether or not they match. When it is determined in step S4 that the search condition matches the speaker information, the process proceeds to step S5. When they do not match, the process proceeds to step S6.

In step S5, based on the identified speaker number, the information of the speaker is searched in the registered database, and the information is output as the search result.

In the subsequent step S6, it is determined whether or not processing of all the data has been completed. When processing of all the data has not been completed, in step S7, the process moves to the next data, and the process returns to step S3. When processing of all the data has been completed in step S6, the search processing is terminated.

Next, the speaker identification process in step S3 described above is described. Before that, processing blocks in the speaker identification process are described using FIG. 5.

Figure 5:
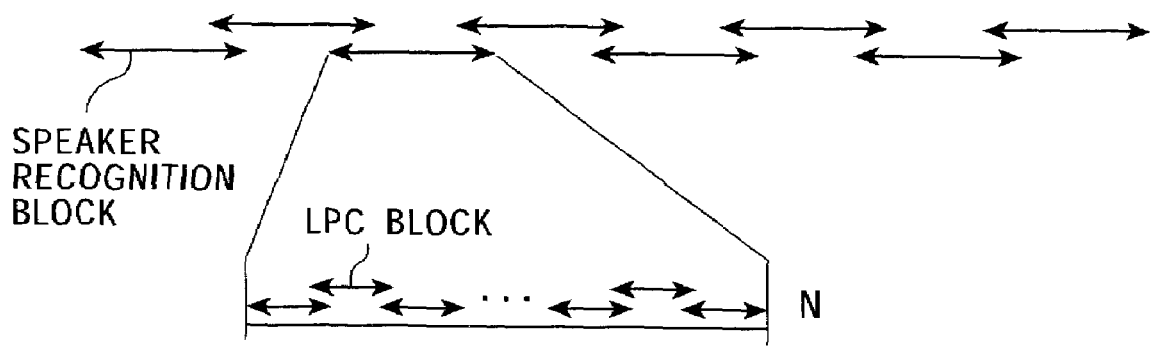
FIG. 5 illustrates the relationship between speaker recognition blocks and LPC analysis blocks in the information search apparatus.

The LPC blocks shown in FIG. 5 are units of processing in which LPC information is extracted from coded speech data, and vector quantization (to be described later) is performed thereon in order to determine quantized distortion. The length of the LPC analysis blocks which are often used is usually approximately 20 or 40 milliseconds. Furthermore, in order to improve the analysis resolution, the blocks are often made to overlap a little with adjacent blocks.

The speaker recognition blocks, formed of N LPC blocks, are minimum units for identifying a speaker by evaluating the vector-quantized distortion, as will be described later. The value of N is determined so that the block length of the speaker recognition blocks becomes approximately several seconds. The speaker recognition blocks may also overlap a little with adjacent regions. Usually, the overlap length is approximately 10% to 50% of the region length.

The speaker identification process in this embodiment will be described below with reference to the flowchart in FIG. 6. The method described below is only an example, and the speaker identification method is not limited to this example.

Initially, in step S10, the position at which the LPC block is read is positioned at the start of the data to be processed. Depending on the application, that position may be positioned at a predetermined position other than the start.

Next, in step S11, the counter n of the number of LPC blocks is initialized to 0. In the subsequent step S12, it is determined whether or not the counter n is less than the number N of LPC blocks contained in the speaker recognition block. When it is determined in step S12 that the counter n is less than the number N of LPC blocks, the process proceeds to step S13. Otherwise, the process proceeds to step S19.

In step S13, data of the n-th LPC block is read from the data to be processed.

Next, in step S14, it is determined whether or not the end of the data to be processed is reached. When the end of the data is reached, the processing is terminated. When the end of the data is not reached, the process proceeds to step S15.

In step S15, only the LSP information part is extracted from the read data of the LPC blocks, the quantized LSP parameter is decoded, and the obtained LSP parameter is converted into an LPC coefficient. Although in this embodiment, LSP parameters are used as the LPC-related information to be extracted (information which can be converted into LPC coefficient), the LPC-related information is not limited to LSP parameters. As long as the LPC-related information can be converted into LPC coefficients, for example, quantized LPC coefficients may be directly used, and PARCOR coefficients (PARtial auto-CORrelation coefficients: partial auto-correlation function) may be used.

In step S16, the LPC coefficient obtained in step S15 is converted into an LPC Cepstrum coefficient.

In the subsequent step S17, vector quantization is performed on the LPC Cepstrum coefficient obtained in step S16 by using a plurality of codebooks which are created in advance. The respective codebooks have one-to-one correspondence with the registered speakers. Here, the vector-quantized distortion of the LPC Cepstrum coefficient of this LPC block by using a codebook CBk is denoted as dk. k represents the codebook's number.

In step S18, 1 is added to the counter n, so that the process moves to the next LPC block, and the process returns to step S12.

In step S19, an average vector-quantized distortion Dk of N LPC blocks within the speaker recognition block is determined.

Next, in step S20, a codebook CBk', corresponding to a speaker Sk' in which the average vector-quantized distortion Dk is minimized, is selected, and this speaker Sk' is assumed to be a speaker candidate Sc. In this manner, a speaker which is closest to the speech of the input data from among the speakers for which codebooks are registered is selected as the speaker candidate Sc in that speaker recognition block.

Next, in step S21, verification of the speaker candidate Sc is performed. That is, since the speaker candidate Sc identified in step S20 is selected as a codebook which simply provides a minimum quantized distortion, one of the codebooks will be selected even for speaker data which is not registered. Therefore, by evaluating the quantized distortion, verification of the identity of the selected speaker candidate Sc is performed. The verification will be described in detail later. As a result of the verification, when the identity is determined, the speaker candidate Sc is authenticated as the identified speaker, and when the identity is rejected, the candidate is determined to be an unknown person.

In step S22, the information of the identified speaker is supplied to the condition comparison section 32 shown in FIG. 2. In the subsequent step S23, the process moves to the next speaker recognition block, and the process returns to step S11.

In the above-described way, a speaker is identified for each speaker recognition block, and the information of the identified speaker is supplied to the condition comparison section 32 shown in FIG. 2.

Figure 6:
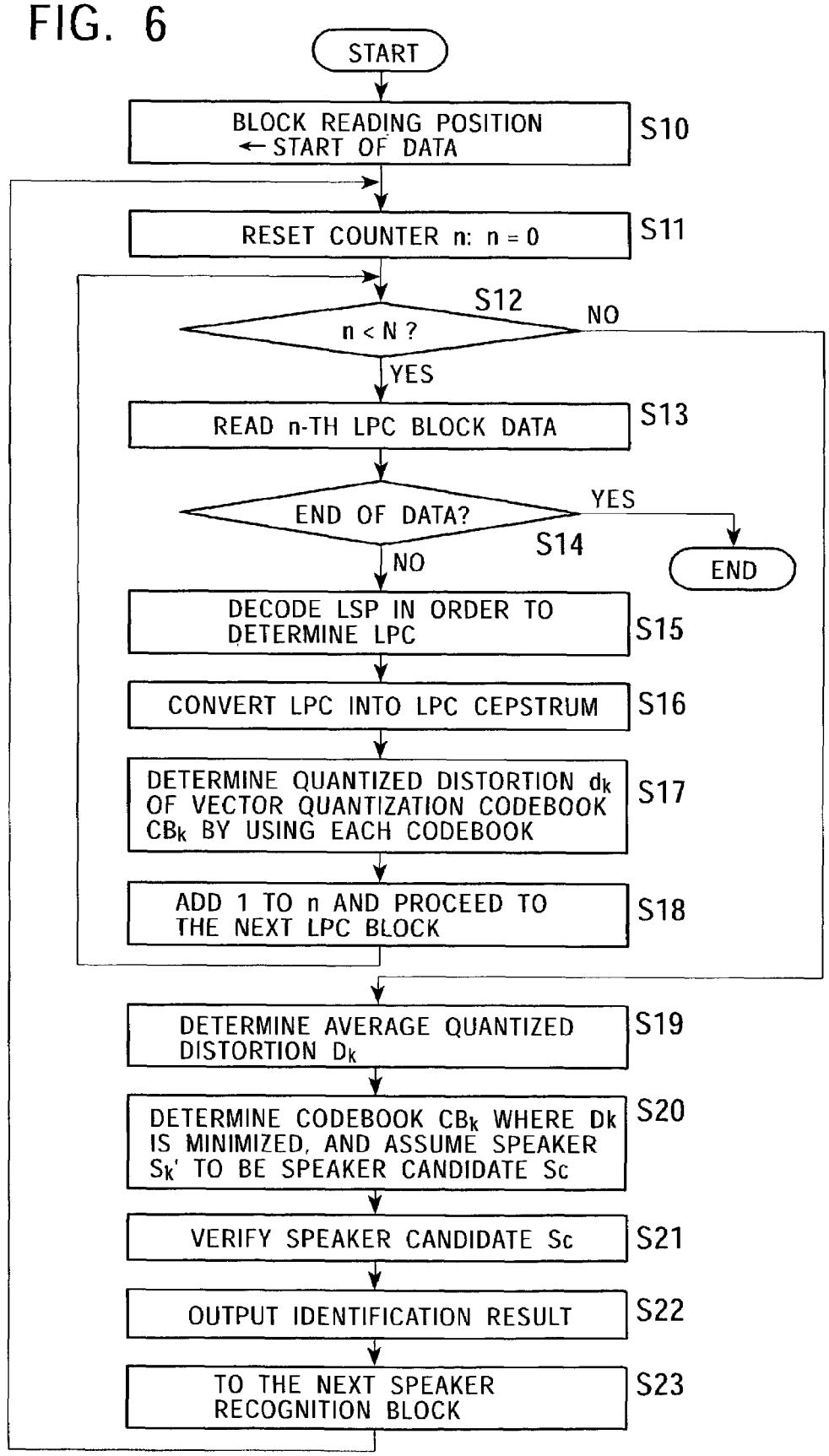
FIG. 6 is a flowchart illustrating a speaker identification process in the information search apparatus.
Figure 7:
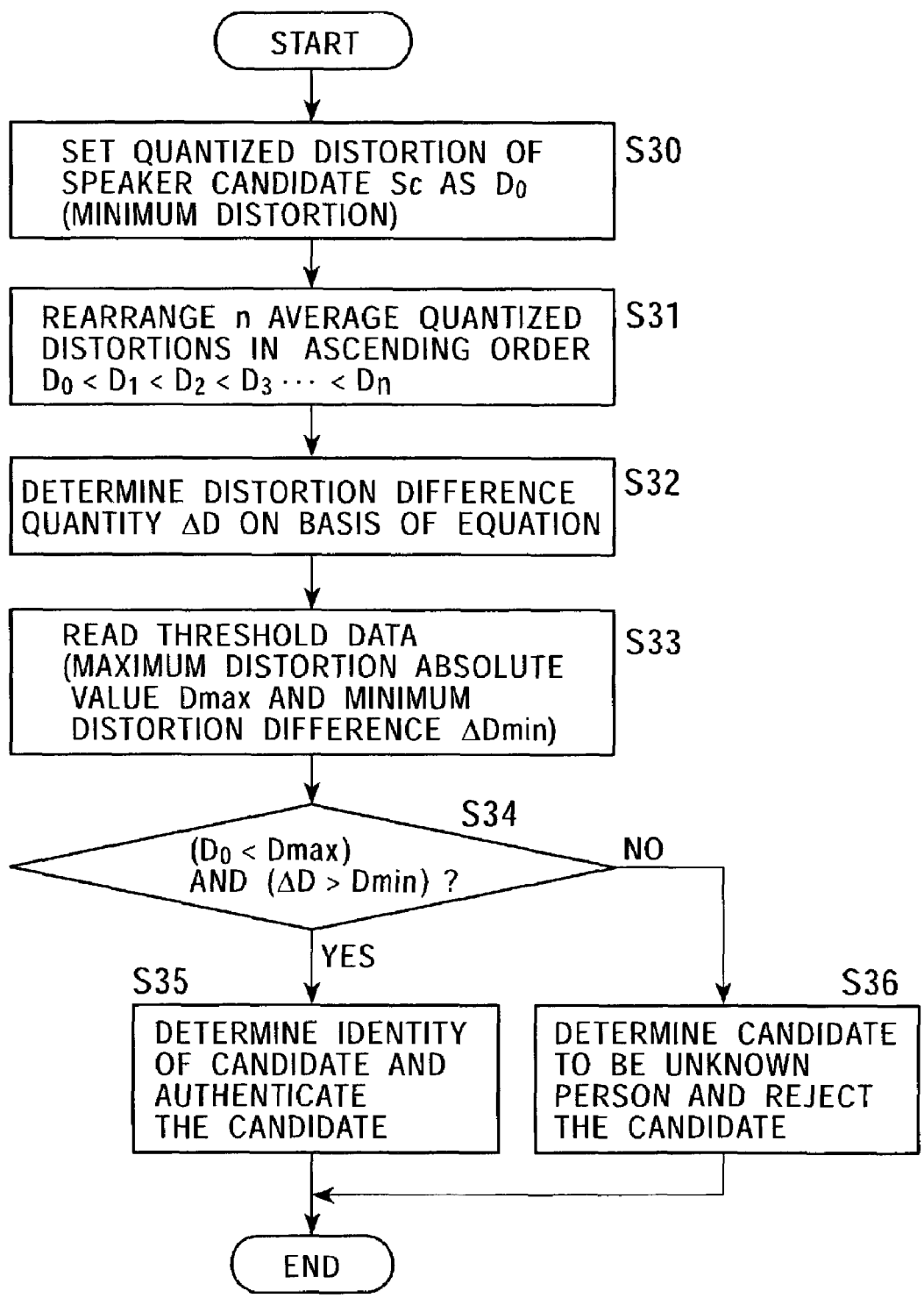
FIG. 7 is a flowchart illustrating a speaker verification process in the information search apparatus.
Figure 10:
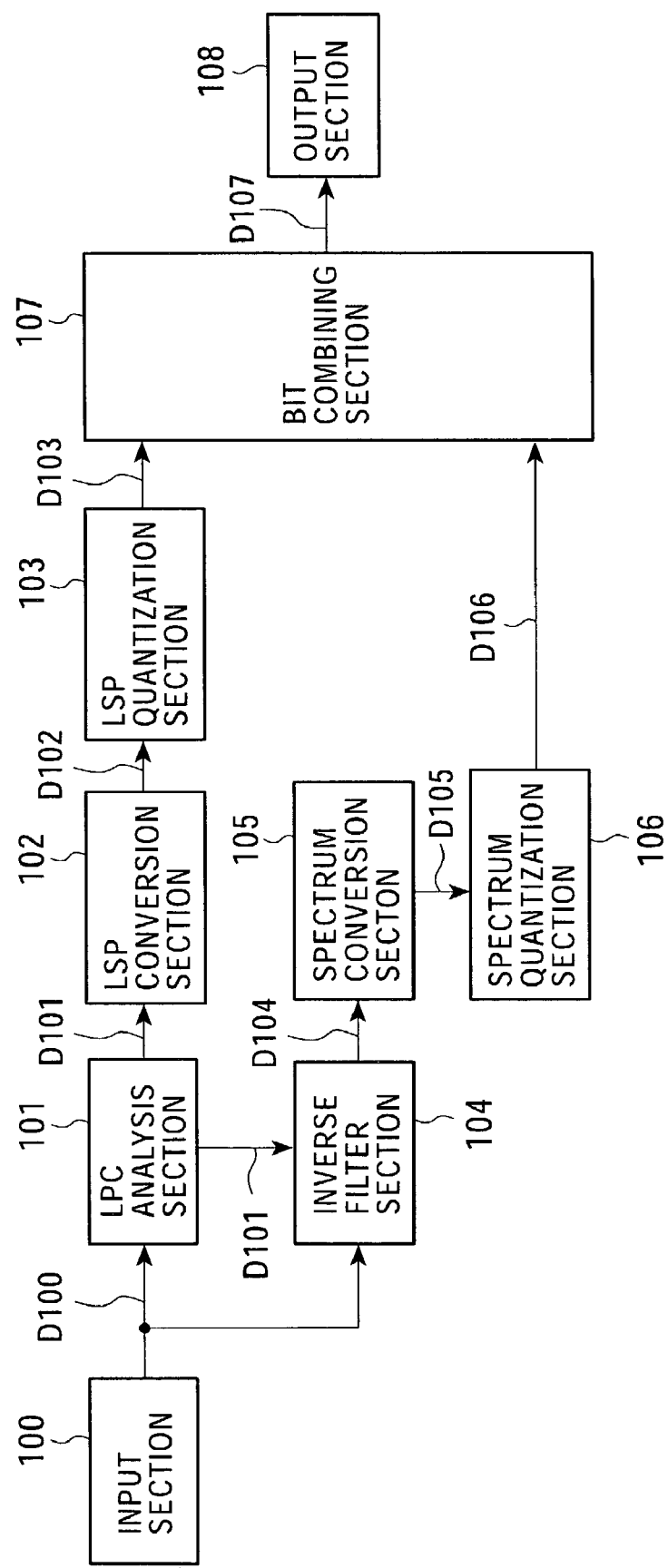
FIG. 10 illustrates the configuration of a general speech coding apparatus using LPC analysis.
Figure 11:
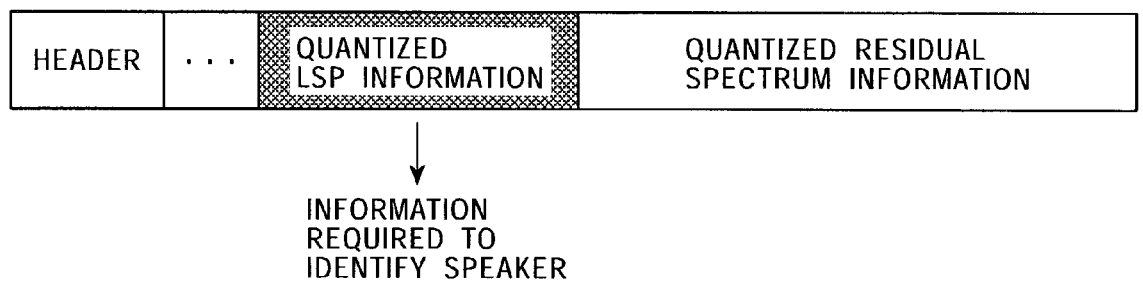
FIG. 11 illustrates an example of a recording format of coded speech data in the speech coding apparatus.

Next, FIG. 7 shows the details of a method of verifying the speaker candidate Sc in step S21 of FIG. 6. Initially, in step S30, the average quantized distortion of the speaker candidate Sc is denoted as D0. Next, in step S31, the average quantized distortions based on each codebook other than that of the speaker candidate Sc are rearranged in ascending order. Among them, n quantized distortions are denoted in ascending order as D1, D2, ... Dn (D0<D1<D2 < ... <Dn). The value of n can be selected arbitrarily.

Next, in step S32, as a measure of evaluation, for the quantized distortion D0 of the speaker candidate Sc and n other quantized distortions, a distortion difference ΔD is determined using equation (3) or (4), $$\Delta D = \sum_{j=1}^{n} D_j - D_0 \qquad (3)$$

$$\Delta D = \frac{1}{n}\sum_{j=1}^{n} D_j - D_0 \qquad (4)$$

In equations (3) and (4), when, for example, n is 1, the difference between the quantized distortion D1 having the smallest quantized distortion subsequent to the quantized distortion D0 of the speaker candidate Sc and the quantized distortion D0 is determined.

Next, in step S33, threshold data corresponding to the speaker candidate Sc is read from a storage section (not shown).

In this storage section, threshold data is recorded for each registered speaker, for example, in a format such as that shown in FIG. 8. That is, as shown in FIG. 8, the speaker identification name of each registered speaker, a maximum absolute distortion D max of quantized distortion, and a minimum distortion difference ΔDmin, which are threshold data, are recorded in advance.

Referring back to FIG. 7, in step S34, a determination is made by comparing the read threshold data Dmax and ΔDmin with the determined D0 and ΔD, respectively. More specifically, in step S34, when the absolute value D0 of the quantized distortion is smaller than the threshold data D max and when the distortion difference ΔD is greater than the threshold data ΔDmin, the process proceeds to step S35, where the identity of the candidate is determined and the candidate is authenticated. Otherwise, the process proceeds to step S36, where the candidate is determined to be an unknown person, and the candidate is rejected. In this manner, by comparing the average quantized distortion D0 of the speaker candidate Sc and the distortion difference quantity ΔD with the respective threshold values, identification errors of the speech data of the registered speakers are reduced, and speech data other than for the registered speakers can be determined to be an unknown speaker.

As a result of the verification such as that described above, the information of the speaker whose identity is determined and who is authenticated as an identified speaker is supplied to the condition comparison section 32, shown in FIG. 2, in the manner described above.

In this condition comparison section 32, the supplied speaker number is compared with the search conditions, such as the name, the registered number, etc., of a desired speaker, supplied from the search condition input section 31. When the speaker number matches the search conditions, the speaker number of the speaker is supplied to the search result output section 33.

The search result output section 33 searches a database (not shown), in which data is registered in a format shown in, for example, FIG. 9, for the information of the speaker on the basis of the speaker number. As shown in FIG. 9, examples of the information of the speaker include the speaker identification number, the speaker codebook number, the name of the speaker, and other information, such as sex, age, etc.

The search result output section 33 outputs the information of the speaker concerned together with the information such as the searched coded speech data name and the position of the desired speaker within the coded speech data.

As described above, according to the information detection apparatus and the information search apparatus in this embodiment, by extracting only the LPC-related information without decoding coded speech data into a speech waveform, a process of decoding the coded speech data and an LPC analysis process for the decoded speech waveform can be omitted. Therefore, the number of computations and the storage capacity necessary for identification processes can be greatly reduced. Furthermore, the deterioration of the recognition rate due to the influence of decoding and reanalysis can be reduced.

The present invention is not limited to only the above-described embodiments, and, of course, various modifications are possible without departing from the spirit and scope of the present invention.

For example, in the foregoing description, a method in which a speaker is identified by using an LPC Cepstrum determined by LPC analysis as features is given as an example. However, the speaker identification method is not limited to the above-described example. That is, although the LPC Cepstrum coefficients effectively represent the spectral envelope information, other features representing the spectral envelope may be used.

Furthermore, the spectral envelope information can be directly used for identification. For example, it is assumed that spectral envelopes S1, S2, . . . , Sn are given at N points on the frequency axis. At this time, a speaker can be identified in such a way that the feature vector x for identification is set as x=[S1, S2, . . . , Sn], this feature vector is subjected to vector quantization in completely the same manner as in an example in which an LPC Cepstrum is used, and the vector-quantized distortion is evaluated.

Furthermore, if the spectral information itself is provided, it is easy to extract a spectral envelope by using LPC analysis, Cepstrum analysis, etc. As a result, also, in this case, identification of the speaker can be performed in a similar manner.

Furthermore, as a speaker recognition method using information other than spectral envelope information, there is also a method in which the speech spectrum is directly analyzed and in which a speaker is identified by using information such as the spectral coefficients, the fundamental frequency, the pitch, the average power, the high-frequency components, and the long-time average spectrum.

For example, a speaker can also be identified by a method in which the pitch, the average power, or several spectral coefficients are used as a feature vector and in which vector quantization is used in the same manner as in the above-described example.

As described above, the present invention can be applied to not only coded speech data having LPC information, but also to coded speech data having spectral envelope information or spectral information.

What is claimed is:

1. An information detection apparatus for detecting predetermined information from coded speech data coded by a speech coding method using spectrum analysis and for identifying and verifying a current speaker, said information detection apparatus comprising:

spectral information decoding means for decoding spectral information from said coded speech data;

speaker identification means for identifying a most likely speaker amongst a plurality of possible speakers on the basis of said decoded spectral information; and verification means for verifying that the most likely speaker actually is the current speaker by setting an average quantized distortion of the most likely speaker as $D_0$, determining the averaged quantized distortions of "n" speakers other than the most likely speaker, determining a distortion difference $\Delta D$ using one of the following two equations:

a) $\Delta D = \sum_{j=1}^{n} D_j - D_0$ b) $\Delta D = \frac{1}{n}\sum_{j=1}^{n} D_j - D_0$ reading threshold data associated with the most likely speaker including the maximum absolute distortion $D_{max}$ of quantized distortion, and a minimum distortion difference $D_{min}$ which had been recorded in advance, and finally outputting a determination that the most likely speaker is the current speaker if ($D_0$<Dmax) and ($\Delta D$>Dmin).

2. An information detection apparatus according to claim 1, wherein said information apparatus includes a database containing a plurality of potential speaker files, each potential speaker file including at least a speaker identification number, absolute maximum distortion value $D_{max}$, and minimum distortion difference $D_{min}$.

3. An information detection apparatus according to claim 2, wherein each of said speaker files includes further speaker attribute information such as age or sex.

4. An information detection apparatus for detecting predetermined information from coded speech data coded by a speech coding method using spectrum analysis and for identifying and verifying a current speaker, said information detection apparatus comprising: spectral information decoding means for decoding spectral information from said coded speech data; speaker identification means for identifying a most likely speaker amongst a plurality of possible speakers on the basis of said decoded spectral information; and verification means for verifying that the most likely speaker actually is the current speaker, and wherein said information apparatus further includes digital audio conversations associated with each speaker, and wherein once the current speaker is identified and verified, said information apparatus conducts further signal processing on the digital audio conversations associated with the current speaker.

5. An information detection method for detecting predetermined information from coded speech data coded by a speech coding method using spectrum analysis and for identifying a current speaker, said information detection method comprising a spectral information decoding step of decoding spectral information from said coded speech data; a speaker identification step of identifying a most likely speaker amongst a plurality of possible speakers on the basis of said decoded spectral information; and a verification step for verifying that the most likely speaker actually is the current speaker, wherein said verification step includes the steps of:

setting an average quantized distortion of the most likely speaker as $D_0$, identifying the averaged quantized distortions of "n" speakers other than the most likely speaker, determining a distortion difference $\Delta D$ using one of the following two equations:

a) $\Delta D = \sum_{j=1}^{n} D_j - D_0$ b) $\Delta D = \frac{1}{n}\sum_{j=1}^{n} D_j - D_0$ reading threshold data associated with the most likely speaker including the maximum absolute distortion $D_{max}$ of quantized distortion, and a minimum distortion difference $D_{min}$ which had been recorded in advance, and finally outputting a determination that the most likely speaker is the current speaker if ($D_0$<Dmax) and ($\Delta D$>Dmin).

6. An information detection method according to claim 5, wherein, in said reading threshold data step, said values $D_{max}$ and $D_{min}$ are read from a speaker file associated with the most likely speaker amongst a plurality of speaker files.

7. An information detection method according to claim 6, wherein, once the current speaker is identified and verified, additional information from the speaker file associated with the current speaker is accessed, such as age or sex.

8. An information detection method for detecting predetermined information from coded speech data coded by a speech coding method using spectrum analysis and for identifying a current speaker, said information detection method comprising a spectral information decoding step of decoding spectral information from said coded speech data; a speaker identification step of identifying a most likely speaker amongst a plurality of possible speakers on the basis of said decoded spectral information; and a verification step for verifying that the most likely speaker actually is the current speaker, and said method further includes the step of, after the current speaker is identified and verified, conducting further signal processing on one or more digital audio conversations associated with the current speaker.

* * * * *